(12) United States Patent
Gneuss

(10) Patent No.: US 6,500,336 B1
(45) Date of Patent: Dec. 31, 2002

(54) POLYMER MELT FILTERING DEVICE WITH CHANGING FILTER PACKETS

(75) Inventor: Daniel Gneuss, Bad Oeynhausen (DE)

(73) Assignee: Gneuss Kunststofftechnik GmbH, Bad Oeynhausen (DE)

(*) Notice: Subject to any disclaimer, the term of this patent is extended or adjusted under 35 U.S.C. 154(b) by 0 days.

(21) Appl. No.: 09/582,696
(22) PCT Filed: Dec. 28, 1998
(86) PCT No.: PCT/EP98/08474
§ 371 (c)(1),
(2), (4) Date: Jun. 29, 2000
(87) PCT Pub. No.: WO99/37463
PCT Pub. Date: Jul. 29, 1999

(30) Foreign Application Priority Data

Dec. 31, 1997 (DE) .......................... 197 58 290

(51) Int. Cl.[7] .................. B27C 47/68; B01D 29/96; B01D 29/62; B01D 35/12
(52) U.S. Cl. .................. 210/236; 210/447; 425/199
(58) Field of Search ................ 425/197, 199; 210/236, 447

(56) References Cited

U.S. PATENT DOCUMENTS

| | | | |
|---|---|---|---|
| 2,878,512 A | * | 3/1959 | Davis |
| 3,583,453 A | * | 6/1971 | Upmeier |
| 3,632,279 A | | 1/1972 | Christy et al. |
| 4,127,370 A | | 11/1978 | Jackson |
| 5,888,557 A | * | 3/1999 | Houk |
| 6,126,430 A | * | 10/2000 | Coyle et al. |

FOREIGN PATENT DOCUMENTS

| | | | |
|---|---|---|---|
| CH | 593786 | * | 12/1977 |
| DE | 1729396 | | 3/1972 |
| DE | 3242286 | * | 5/1984 |
| FR | 1210419 | | 3/1960 |
| JP | 7-214641 | * | 8/1995 |

* cited by examiner

Primary Examiner—Thomas M. Lithgow
(74) Attorney, Agent, or Firm—Friedrich Kueffner

(57) ABSTRACT

A polymer melt filtering device comprising a housing with an inflow (3) and an outflow (4) for the polymer melt, in addition to a slider (5) which can be sealingly displaced therebetween, perpendicular to said inflow and outflow. The slider (5) consists of filtering layers (7) which are supported in cavities (8) and which can be selectively placed in between the inflow and outflow. The housing is comprised of two parts (1, 2) that are arranged in such a way that their front surfaces face towards each other. The inventive device is characterised in that one of the parts of the housing (1, 2) is floatingly mounted; in that the parts of the housing are reinforced in the middle area of the housing by beads (11), whereby the edges thereof (pressure surfaces 12) are slanted towards the outside or are conical; and in that the parts of the housing (1, 2) are maintained by clamping plates (12–15) which can be placed against each and which encompass and clamp the beads (11).

7 Claims, 1 Drawing Sheet

POLYMER MELT FILTERING DEVICE WITH CHANGING FILTER PACKETS

BACKGROUND OF THE INVENTION

1. Field of the Invention

Device for filtering polymer melts having a housing provided with an inflow as well as an outflow for the polymer melt in which a slide is seal-tight arranged between the openings of the inflow and the outflow so as to be moveable in a direction transverse to the inflow and the outflow, which slide has filter layers supported in cavities and correlatable with the inflow and outflow as desired.

2. Description of the Related Art

Such devices for filtering polymer melts, in which the filter layers contained in the filter cavities are movable, as desired, into the melt flow by displacement of the parallel-epipedal or cylindrical slides, are known in various embodiments. The housing in which the slide is slidably arranged can be of a one-part construction or can be comprised of several mechanical component groups which are fixedly connected to one another, for example, by screws. In all of these arrangements, however, the sealing of the highly pressurized melt flow relative to the exterior is a problem, especially since the slides should be slidable as easily as possible and the sliding movement of the surfaces gliding on one another should exert only a minimal resistance against sliding despite the acting pressure.

In order to realize these problematic sealing configurations, it has been customary so far to provide very long sealing surfaces so that the melt will play itself out in the formed narrow gap, i.e., its pressure will decrease along this gap with minimal gradient. On the other hand, the parts to be sealed relative to one another have been manufactured in the past with very tight tolerances and high pressing forces have been exerted which require complex spring elements for their stabilization and which require with regard to the sealing rings a very high hardness as well as minimal frictional resistance and minimal erosion in order to be able to perform the required movement with acceptable expenditure. DE-A 17 29 396 suggests a complex arrangement which, when the sliding movement is started, relieves the seal and, after completion of an adjusting movement, realizes a high compression force by means of a wedge drive. Finally, it is also possible to employ minimal pressing forces when extremely high fitting tolerances and thus correspondingly high manufacturing expenditures are employed. In all of these cases, however, an undesirable high mechanical expenditure in combination with a limitation of the movability results.

FR 1 210 419 shows cylindrical components with outwardly projecting beads whose flanks are outwardly inclined and which are surrounded by two clamping ring halves that are moveable toward one another. A tube socket surrounding a perforated plate is provided as a seal. No measures are provided in the connecting area to move, remove or exchange parts so that no suggestions can be taken in regard to filter exchange arrangements.

SUMMARY OF THE INVENTION

The invention therefore has the object to provide a device of the aforementioned kind which is of a simple configuration, allows a relatively inexpensive manufacture by providing a relatively wide tolerance range and which furthermore makes it possible to move the slide, having the filter layers to be exchanged, with relatively minimal forces and without significant wear of the guiding and sealing surfaces.

This object is solved by the features listed in the characterizing portion of the claim 1. They make it possible to operate with relatively minimal pressing forces without losing effectiveness of the seals so that the required forces for movement as well as the wear resulting from the movement of the guide and sealing elements is minimal.

Expedient, advantageous, and inventive further developments of the subject-matter of the invention can be taken from the following dependent claims.

BRIEF DESCRIPTION OF THE DRAWING

The features of the invention are explained in detail with the aid of the description of one embodiment in connection with the drawings illustrating it. It is shown in.

DESCRIPTION OF THE PREFERRED EMBODIMENTS

Figure 1:
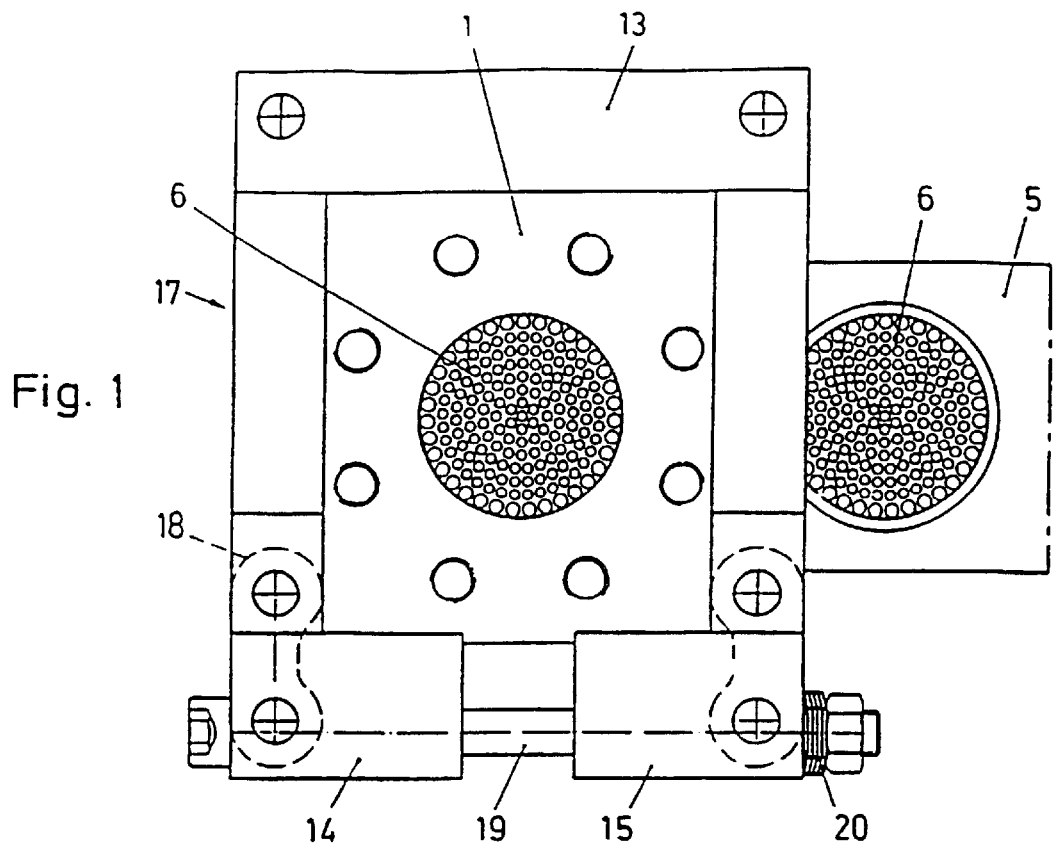
FIG. 1 a plan view onto a filtering device.
Figure 2:
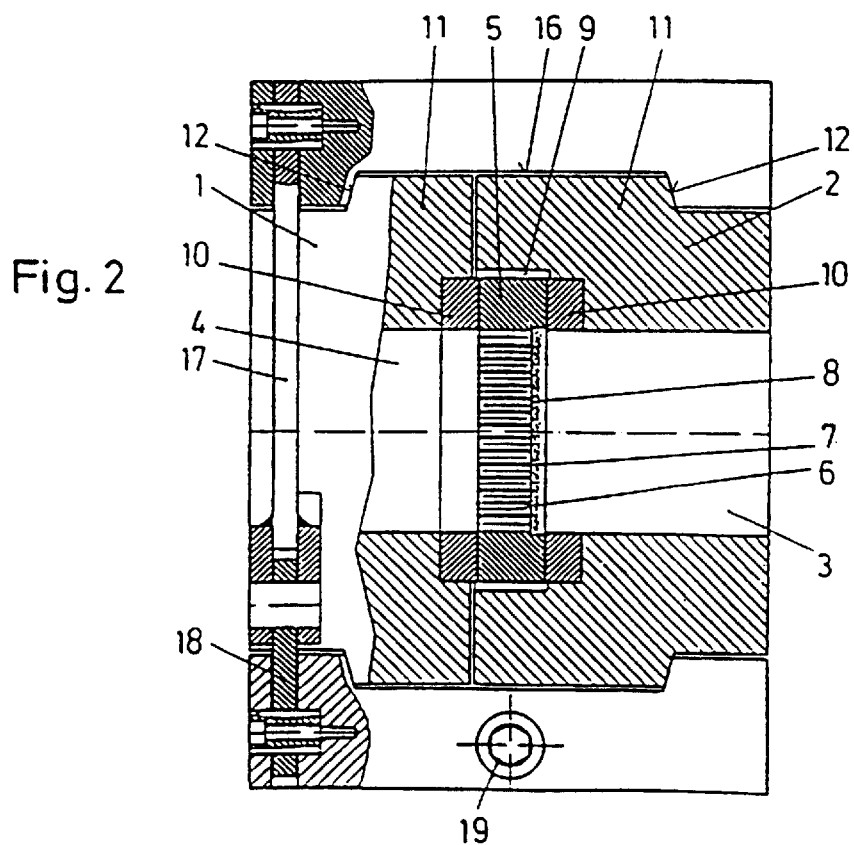
FIG. 2 a partial longitudinal section of the filtering device of FIG. 1.

In the Figures, a housing of a filtering device comprised of two housing parts 1 and 2 is illustrated wherein an inflow 3 and an outflow 4 for the polymer melt to be filtered or for the filtered polymer melt are connected to the housing parts. Housing part 2 has a recess 9 in which a slide 5 is moveably guided in a direction transverse to the direction of the inflow 3 and outflow 4. This slide comprises filter plates 6 which are very strong for the purpose of supporting filter layers 7 positioned in the cavities 8 above these filter plates 6, but are of a sieve-design with bores. As illustrated in FIG. 1, a slide 5 can have two cavities 8 with filter plates 6 for the filter layers 7. However, it can also be of a longer configuration and can thus have a correspondingly larger number of filter layers to be introduced into the melt flow.

The front faces of the housing parts 1 and 2 face one another and are provided respectively with sealing rings 10 mounted in annular grooves for providing a sealing action. The housing parts 1, 2 themselves are provided with projecting beads 11 whose free ends are provided with inclined pressing surfaces 12.

The two housing parts 1 and 2 are held together by special clamping plates 13 through 15 which are provided respectively with recesses 16 surrounding the beads 11. The upper ends of the Figures show a single-piece clamping plate 13 having legs 17 pivotably arranged at its ends and the legs themselves end in guide arms 18 which are pivotably connected to the clamping plates 14 and 15. The clamping plates 14 and 15 are provided with longitudinal bores which are penetrated by a clamping screw 19. In order to provide a certain elasticity, the clamping screw 19 is additionally provided with spring plates 20.

In operation, as illustrated in the drawing, after insertion of the sealing rings 10 into their annular grooves, the housing parts 1 and 2 are aligned with their front surfaces toward one another and the slide 5, furnished with the filter plates 6, is inserted into the recess 9. Subsequently, the clamping plates 14 and 15 are moved toward one another via the legs 17 and the guide arms 18 wherein the beads 11 are inserted into their recesses 16. Now the clamping screw 19 is inserted into the bores of the clamping plates 14 and 15, the spring plates 20 are threaded onto the free ends of the screw, and the nuts 21 is threaded onto the clamping screw.

The clamping screw aligns the clamping plates 14 and 15 relative to one another and, upon further tightening thereof, they are approaching one another and the guide arms 18 pivoted toward one another. Their pivot axes on the clamping plates 14 and 15 are guided during this movement along a circular arc; this means that the two clamping plates 14 and 15 are moved toward one another as well as against the clamping plate 13. The movement of the clamping plates toward one another causes the inclined pressing surfaces of its recesses 16 to move toward one another and to clamp the housing parts 1 and 2 against one another by means of their pressing surfaces 12. Simultaneously, a movement in the direction toward the clamping plate 13 is also effected so that beads 11 engaging in its recesses are moved further toward one another by means of the inclined pressing surfaces 12 upon being pressed deeper into the recesses. This means also that the housing parts 1 and 2 are pressed against one another by means of the slanted pressing surfaces 12 of the recesses 16 of the clamping plate 13 through 15 when the nut 21 of the clamping screw 19 is tightened. Since the recess 9, the height of the slide 5 as well as the thickness of the sealing rings 10 and the depth of the annular grooves receiving them are dimensioned such that the end faces of the housing parts 1 and 2 will not yet contact one another, the thus produced clamping force acts exclusively on the sealing rings 10 as well as the surface areas of the slide 5 supporting them. Accordingly, with simple means a supporting force is induced which is satisfactory even under highest melt pressures, and, as a result of the overhung support of the housing parts, the problem of a plan parallel arrangement of the elements realizing the sealing action, which is otherwise an issue, is eliminated, and this could otherwise be achieved only with a very high technical manufacturing expenditure.

The invention is not limited to the means employed in the embodiment. For example, it is also possible to employ cylindrical housing parts in connection with a clamping ring, and generally, the clamping mechanism can be changed. It is only important that the housing parts are pressed against one another by a movement within the plane of their end faces so that the sealing surfaces rest with the required pressing forces against one another. Also, the slide must not necessarily have a rectangular cross-section; it is also possible to employ, for example, cylindrically formed slides that are already in use and known as "bolts". In any case, the basic separation of the housing into separate housing parts and the suggested overhung support provide an inexpensive manufacture in connection with a simple configuration.

List of Reference Numerals

1 housing part
2 housing part
3 inflow
4 outflow
5 slide
6 filter plates
7 filter layers
8 cavity
9 recess
10 sealing rings
11 beads
12 pressing surfaces
13 clamping plates
14 clamping plates
15 clamping plates
16 recesses
17 leg
18 guide arm
19 clamping screw
20 plate springs
21 nut

What is claimed is:

1. A device for filtering polymer melt comprising a housing having an inflow and an outflow for the polymer melt, the inflow and the outflow having openings, wherein a slide is tightly arranged between the openings of the inflow and the outflow, the slide being mounted so as to be movable in a direction transversely of the inflow and the outflow, wherein the slide comprises filter layers supported in cavities and correlatable with the inflow and the outflow as desired, the housing being comprised of two housing parts oriented with their end faces towards one another, wherein one of the housing parts is supported in an overhung manner, wherein the housing parts are in a middle area of the housing reinforced by beads having flanks, wherein the flanks are inclined outwardly or are conical, further comprising clamping plates for securing the housing parts, wherein the clamping plates are mounted so as to be movable relative to each other, wherein the clamping plates have recesses, and wherein the recesses engage around the beads and rest against the inclined flanks of the beads.

2. The device according to claim 1, wherein the recesses have flanks which rest against and are clampable to the inclined flanks of the beads.

3. The device according to claim 1, wherein the clamping plates have the shape of a square or rectangle.

4. The device according to claim 1, wherein the clamping plates are connected to one another at ends thereof by means of joints.

5. The device according to claim 1, wherein the clamping plates are mounted so as to be movable parallel to each other.

6. The device according to claim 1, further comprising clamping screws for clamping at least one of the clamping plates and free ends of the clamping plates.

7. The device according to claim 1, further comprising a clamping screw extending through two of the clamping plates for clamping the clamping plates together, wherein the clamping plates are connected through guide arms to legs of a third of the clamping plates.

* * * * *